United States Patent [19]

Craven

[11] 3,825,013

[45] July 23, 1974

[54] BALLOON CATHETER
[75] Inventor: William J. Craven, El Reno, Okla.
[73] Assignee: MCM Hospital Supplies, Inc., El Reno, Okla.
[22] Filed: Mar. 12, 1973
[21] Appl. No.: 340,041

[52] U.S. Cl............... 128/349 B, 128/246, 128/344
[51] Int. Cl........................................... A61m 25/00
[58] Field of Search.......... 128/348, 349 B, 349 BV, 128/350 R, 351, 344, 325, 246

[56] References Cited
UNITED STATES PATENTS

| | | | |
|---|---|---|---|
| 2,693,191 | 11/1954 | Raiche | 128/349 B |
| 2,810,043 | 7/1883 | Finney | 128/246 |
| 2,936,761 | 5/1960 | Snyder | 128/349 B |
| 3,220,411 | 11/1965 | Czorny | 128/214.4 |
| 3,402,718 | 9/1968 | Doherty | 128/349 BV |
| 3,528,869 | 9/1970 | Dereniuk | 128/349 B |

*Primary Examiner*—Dalton L. Truluck
*Attorney, Agent, or Firm*—Dunlap, Laney, Hessin, Dougherty & Codding

[57] ABSTRACT

This invention relates to an improved balloon catheter of the type including an elongated flexible tubular member having a drainage lumen formed therein. An inflatable balloon member is attached to the tubular member at its distal end and a passage is formed in the tubular member for inflating and deflating the balloon member from the proximal end of the tubular member. A second passage is provided with a removable plug disposed therein communicating the interior of the balloon member with the proximal end of the tubular member so that deflation of the balloon member can be positively indicated and accomplished by way of the second passage.

5 Claims, 5 Drawing Figures

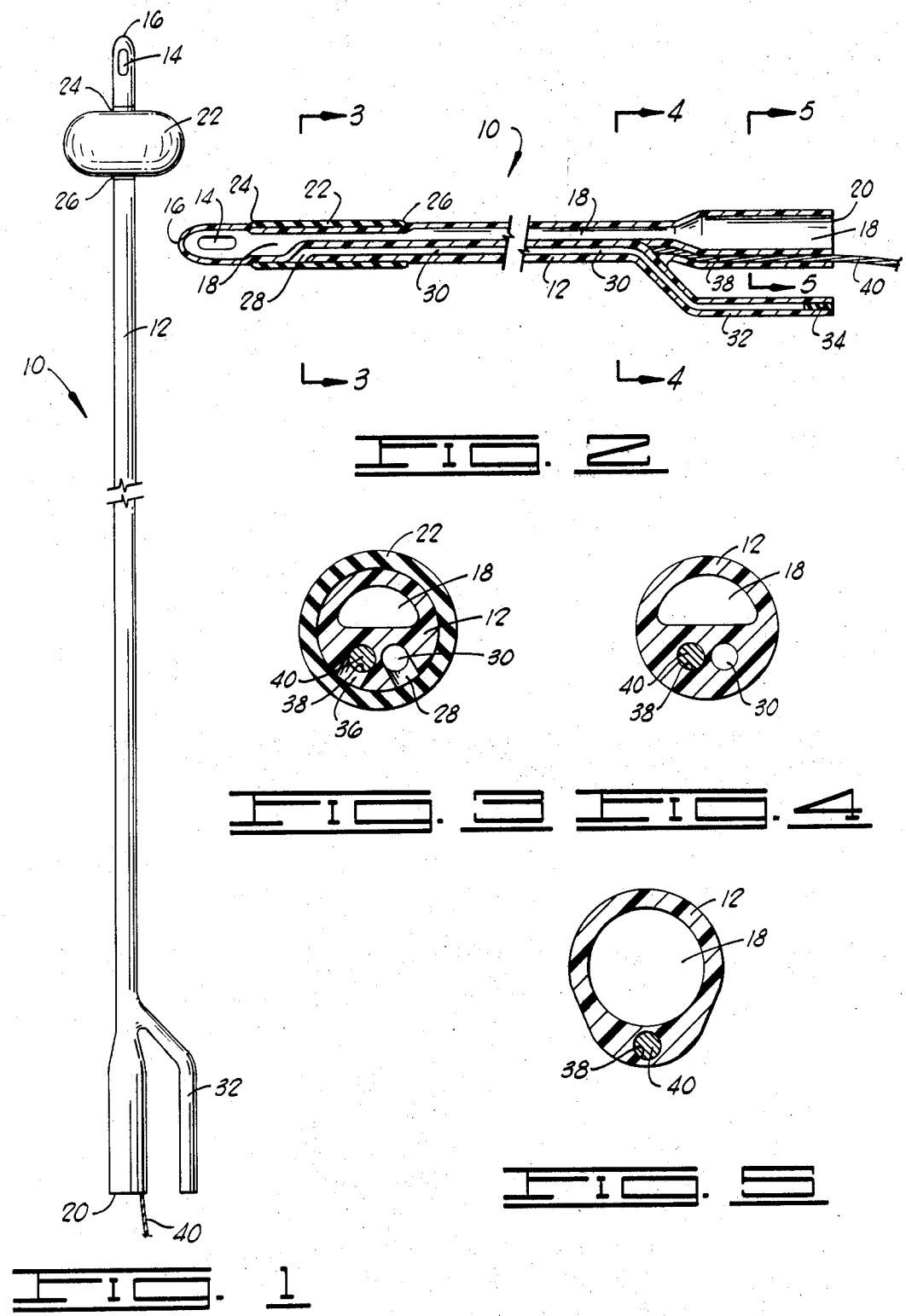

BALLOON CATHETER

BACKGROUND OF THE INVENTION

1. Field of the Invention

This invention relates generally to an improved balloon catheter, and more particularly, but not by way of limitation, to an improved balloon catheter of the type wherein the balloon is inflated by introducing an inflating fluid therein from the proximal end of the catheter.

2. Description of the Prior Art

Various catheter devices having inflatable bags or balloons associated therewith have been developed and used. These inflatable balloon catheters are conventionally used to drain urine from the human bladder. Generally, the catheter is introduced into the bladder through the urethra and positioned so that the inflatable balloon at the distal end of the catheter is within the bladder. The balloon is then inflated by injecting fluid such as water into the balloon from the proximal end of the catheter. The inflated balloon retains the distal end of the catheter within the bladder and prevents it from being inadvertently dislodged.

So that the balloon can be inflated after introduction into the bladder, an inflation passage is included in the catheter extending from the interior of the balloon to the proximal end of the catheter. Generally, the predetermined volume of inflating fluid required to distend the balloon is measured into a hypodermic syringe and the hypodermic needle of the syringe is pushed through a soft plug at the end of the inflation passage. The inflating fluid is injected into and through the passage so that the balloon is inflated. When it is desired to remove the catheter from the bladder, the inflation passage is opened so that the inflating fluid escapes the catheter and the balloon is deflated.

While balloon catheters of the type described above have generally been used successfully, problems have been encountered in the deflation of the balloon and removal of the catheter from the bladder. Specifically, the inflation passage connecting the interior of the balloon with the proximal end of the catheter sometimes becomes plugged so that the balloon cannot be deflated or is only partially deflated. This circumstance can cause considerable trauma to the patient as well as necessitate the resort to drastic procedures in order to remove the catheter.

By the present invention an improved catheter of the balloon type is provided which obviates the problems mentioned above through the provision of a second passage for indicating deflation of the balloon and bringing about deflation when the primary inflation passage becomes plugged or sealed.

SUMMARY OF THE INVENTION

The present invention relates to an improved balloon catheter which comprises an elongated flexible tubular member having a drainage lumen formed therein, said drainage lumen opening into the proximal end of the tubular member and communicating with at least one drainage inlet at the distal end thereof, an inflatable balloon member positioned adjacent the distal end of the tubular member and attached thereto in a manner such that when inflated the balloon member is distended in directions generally normal to the axis of the tubular member, a first passage formed in the tubular member connecting the interior of the balloon member with the proximal end of the tubular member so that an inflating fluid can be selectively injected through the first passage into the balloon member or withdrawn therefrom, and a second passage formed in the tubular member connecting the interior of the balloon member with the proximal end of the tubular member, said second passage including an elongated string member disposed therein along the entire length thereof so that deflation of the balloon member can be indicated and accomplished by extraction of the string member from the second passage.

It is, therefore, a general object of the present invention to provide an improved balloon catheter.

A further object of the present invention is the provision of a balloon catheter which includes an elongated flexible tubular member having a pair of passages formed therein connected between the interior of the balloon and the proximal end of the tubular member so that if deflation cannot be accomplished through one of the passages the other passage can be utilized.

Yet a further object of the present invention is the provision of an improved balloon catheter having a secondary deflation passage connected between the balloon and the proximal end of the catheter so that positive indication and assurance of deflation of the balloon can be obtained prior to removal of the catheter from the bladder.

Other and further objects, features and advantages of the present invention will be readily apparent to those skilled in the art upon a reading of the description of preferred embodiments which follows when taken in conjunction with the accompanying drawings.

DESCRIPTION OF THE DRAWINGS

FIG. 1 is a side elevational view of the improved balloon catheter of the present invention positioned vertically with the balloon shown in its inflated state;

FIG. 2 is an enlarged side elevational cross-sectional view of the balloon catheter of FIG. 1 positioned horizontally with the balloon in its deflated state;

FIG. 3 is an enlarged cross-sectional view taken along line 3—3 of FIG. 2;

FIG. 4 is an enlarged cross-sectional view taken along line 4—4 of FIG. 2; and

FIG. 5 is an enlarged cross-sectional view taken along line 5—5 of FIG. 2.

DESCRIPTION OF A PREFERRED EMBODIMENT

Referring now to the drawings and particularly to FIGS. 1 and 2, one embodiment of the improved balloon catheter of the present invention is illustrated and generally designated by the numeral 10. The catheter 10 basically comprises an elongated flexible tubular member 12 having one or more drainage inlets 14 positioned adjacent the distal end 16 thereof which is smoothly blunted for ease of insertion through the urethra into the bladder. As best shown in FIG. 2, the tubular member 12 includes a drainage lumen 18 extending from the drainage inlets 14 at the distal end 16 thereof to the enlarged proximal end 20 thereof. The proximal end 20 of the catheter 10 is enlarged to receive a glass tube or the like as will be described further hereinbelow.

An inflatable sleeve or balloon member 22 is attached to the tubular member 12 adjacent the distal end 16 thereof immediately rearwardly of the drainage inlets 14. The balloon member 22 is sealingly attached to the peripheral surface of the tubular member 12 at its forward and rearward ends 24 and 26 respectively, with the intermediate portion of the balloon being unattached and remaining free to distend outwardly in directions generally normal to the axis of the tubular member 12 as shown in FIG. 1. Preferably, when deflated the balloon member 22 takes the form of a cylindrical sleeve having an outside diameter only slightly larger or equal to the outside diameter of the tubular member 12 so that the catheter 10 can be readily introduced into and withdrawn from the bladder.

Referring specifically to FIG. 2, the tubular member 12 includes an opening 28 in the peripheral surface thereof positioned to communicate with the interior of the balloon member 22, i.e., positioned intermediate the sealed ends 24 and 26 of the balloon member 22. A first passage 30 is formed in the tubular member 12 which connects the opening 28 with a closed divergent tube attached to the tubular member 12 adjacent the proximal end 20 thereof. That is, the passage 30 communicates the interior of the balloon member 22 by means of the opening 28 with the divergent tube 32 attached to the tubular member 12. The hollow portion of the divergent tube 32 forms an extension of the passage 30 and is closed by a soft plug 34, a valve member or other suitable means.

As best shown in FIG. 3, a second opening 36 is formed in the peripheral surface of the tubular member 12 between the ends 24 and 26 of the balloon member 22. A second passage 38 is formed in the tubular member 12 which connects the opening 36 with the proximal end 20 of the tubular member 12. That is, the passage 38 extends the length of the tubular member 12 and communicates with the interior of the balloon member 22. As shown in FIGS. 2 and 5, the passage 38 extends along and through a wall portion of the tubular member 12 at the enlarged proximal end 20 thereof. The drainage lumen 18 has a generally circular cross-section at the proximal end 20 for slipping over glass tubing or the like and the cross-sectional shape of the tubular member 12 is generally ovoid or oval to include a thickened portion which accommodates the passage 38. The passage 38 is therefor preferably sealed by a string member 40 disposed within the passage 38 along its entire length with a portion of the string member 40 extending beyond and outside the proximal end 20 of the tubular member 12 as shown in FIGS. 1 and 2.

The catheter 10 must be formed of a soft and flexible material to facilitate its introduction into the bladder, etc. Particularly suitable materials which have been conventionally utilized are rubbery materials such as silicone rubber, natural latex rubber and other similar inert rubbery substances. Preferably, the catheter 10 is formed of natural latex rubber with the string member 40 disposed in the passage 38 being formed of nylon.

OPERATION

In use of the improved catheter 10, it is inserted through the urethra of a patient so that the distal end 16 of the tubular member 12 and the balloon member 22 attached thereto are positioned within the bladder. As will be understood by those skilled in the art, the proximal end 20 of the catheter 10 remains outside the patient's body and a predetermined quantity of inflating fluid such as water is injected or otherwise introduced into the hollow portion of the divergent tube 32, through the first passage 30 and the opening 28 of the tubular member 12, and into the interior of the balloon member 22 causing the balloon member 22 to be inflated and distended. Once the balloon member 22 has been distended to retain the distal end 16 of the catheter 10 within the patient's bladder, a glass tube is fitted within the drainage channel 18 at the proximal end 20 of the catheter 10 for leading bodily fluids drained through the inlets 14 and lumen 18 thereof to a suitable container.

When it is desirable to remove the catheter 10 from the bladder, the passage 30 is opened (usually by cutting off the divergent tube 32) to cause deflation of the balloon member 22. That is, the inflating fluid contained within the balloon member 22 is caused to flow through the opening 28 and passage 30 out of the catheter 10. When the flow of inflating fluid through the passage 30 has ceased, the string member 40 is extracted from the passage 38. The extraction of the string member 40 opens the second passage 38 communicated with the interior of the balloon member 22 so that any inflating fluid prevented from exiting the interior of the balloon member 22 by way of the passage 30 exits by way of the passage 38.

As will be understood the opening of the second passage 38 after opening the first passage 30 provides a positive indication that the balloon member 22 is deflated prior to an attempt to withdraw the catheter 10 from the patient's body. Since the string member 40 is disposed in and along the entire length of the passage 38, its withdrawal (by pulling the string member 40 from the proximal end 20 of the catheter 10) insures the passage 38 is open. Further, if the balloon member 22 cannot be deflated by the opening of the first passage 30, i.e., if the first passage 30 is plugged or collapsed, the balloon member 22 can be deflated by means of the passage 38.

From the foregoing, it will be readily apparent to those skilled in the art that the present invention provides a greatly improved balloon catheter which obviates the problems experienced with heretofore used catheters and insures the quick and easy removal thereof from a patient's bladder. The present invention, therefore, is well adapted to carry out the objects and attain the ends and advantages mentioned as well as those inherent therein. While a presently preferred embodiment of the invention has been described, numerous changes in the details of construction and arrangement of parts can be made which will readily suggest themselves to those skilled in the art and which are encompassed within the spirit of this invention and the scope of the appended claims.

What is claimed is:

1. An improved balloon catheter which comprises:
   an elongated flexible tubular member having a drainage lumen formed therein connected between the proximal end thereof and at least one drainage inlet formed in the distal end thereof;
   an inflatable balloon member positioned adjacent the distal end of said tubular member and attached thereto in a manner such that when inflated said balloon member is distended in directions generally normal to the axis of said tubular member;
   a first passage formed in said tubular member connecting the interior of said balloon member with the proximal end of said tubular member so that an inflating fluid can be selectively injected through the first passage into the balloon member or withdrawn therefrom;

a second passage formed in said tubular member connecting the interior of said balloon member with the proximal end of the tubular member so that deflation of the balloon member can be indicated and accomplished by way of the second passage; and an elongated string member disposed within and along the entire length of the second passage, the string member sealing the passage while disposed therein, but opening the passage when extracted therefrom.

2. The improved catheter of claim 1 wherein the first passage opens into a closed divergent tube attached to said tubular member adjacent the proximal end thereof.

3. The improved catheter of claim 2 wherein the tubular member is formed of natural latex rubber and the string member is formed of nylon.

4. In a balloon catheter which includes an elongated flexible tubular member having a drainage lumen formed therein connecting the proximal end thereof with at least one drainage inlet at the distal end thereof, an inflatable balloon member positioned and attached to the tubular member adjacent the distal end thereof and a first passage formed in the tubular member connecting the interior of the balloon member with the proximal end of the tubular member so that an inflating fluid can be selectively injected through the passage into the balloon member or withdrawn therefrom, the improvement which comprises:

said tubular member including a second passage formed therein connecting the interior of the balloon member with the proximal end of the tubular member so that deflation of the balloon member can be indicated and accomplished by way of the second passage; and an elongated string member disposed within and along the entire length of the second passage, said string member sealing the passage when disposed therein, but opening the passage upon extraction therefrom.

5. The catheter of claim 1 wherein the tubular member is formed of natural latex rubber and the string member is formed of nylon.

* * * * *